Feb. 21, 1967
A. F. GRANT
3,304,808
REVERSING AND REDUCTION GEAR
Filed Nov. 5, 1964
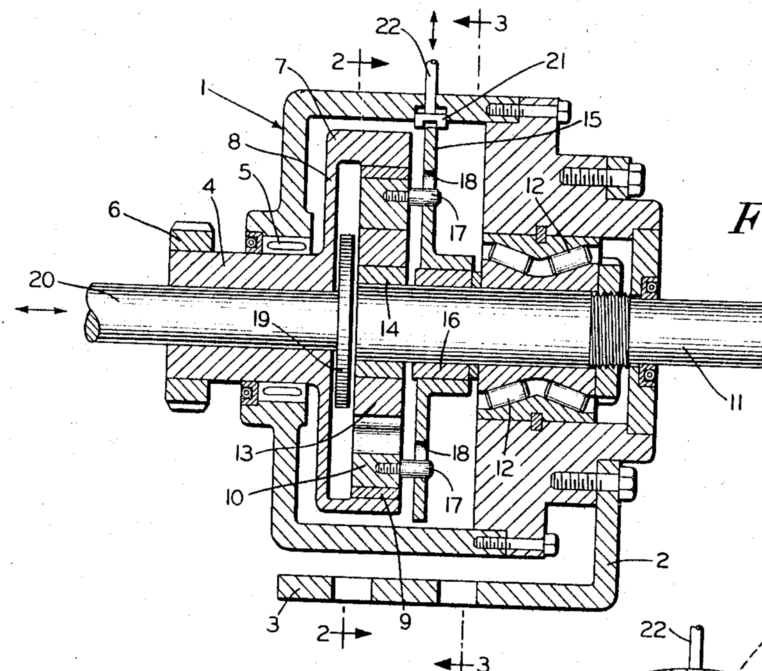
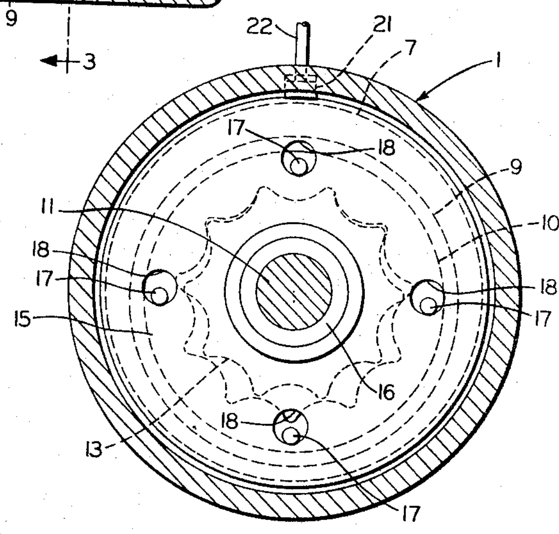
Fig. 2
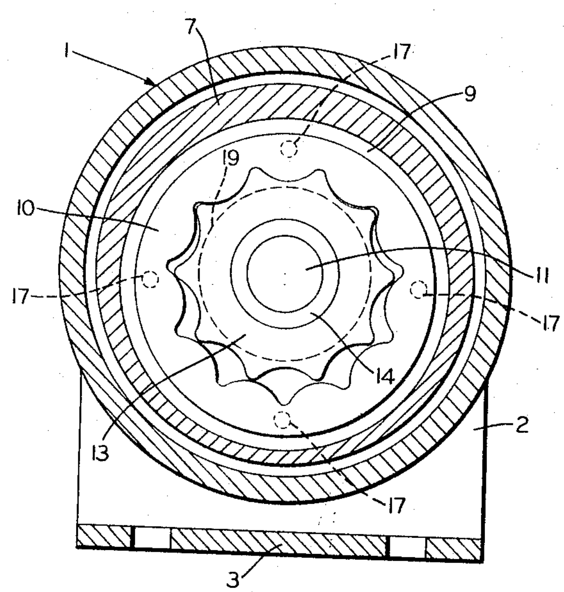
INVENTOR.
*Arthur F. Grant*
BY
*Frease, Bishop, Johns & Schick*
ATTORNEYS United States Patent Office 3,304,808

Patented Feb. 21, 1967

3,304,808

REVERSING AND REDUCTION GEAR

Arthur F. Grant, Shaker Heights, Ohio, assignor to Allied Machine & Engineering Corporation, Cleveland, Ohio, a corporation of Ohio Filed Nov. 5, 1964, Ser. No. 409,114
7 Claims. (Cl. 74—760)

The invention relates to direction reversing and speed reduction gears, and more particularly to such apparatus utilizing the gear-within-gear principle.

A type of high speed, low torque hydraulic motor now in use works on the principle of a pinion gear on the output shaft being rolled, by cam or eccentric means, within a ring gear. One manufacturer sells such hydraulic motors under the trademark "Gerotor." In this particular type of hydraulic motor each of the gears has relatively few, comparatively large teeth, the ring gear usually having only one, or at most, two more teeth than the pinion gear.

Other hydraulic motors of this gear-within-gear type have gears with more or less conventional gear teeth, splines or serrations, the ring gear usually having several more teeth, splines or serrations than the pinion gear.

The object of the invention is to utilize the gear-within-gear principle for a reversing and reduction gear.

Another object of the invention is to provide a reversing and reduction gear including a ring gear and a pinion gear therein, and brake means associated with each gear.

A further object of the invention is to provide such a reversing and reduction gear with means for independently applying each brake means.

A still further object of the invention is to provide a reversing and reduction gear of the character referred to with means for disconnecting the input from the output by releasing both brake means and permitting free wheeling of the ring gear and the pinion gear.

Another object of the invention is to provide a reversing and reduction gear of this type in which the pinion gear is connected to the output shaft through an overrunning clutch operating in one direction and a braking disc operatively associated with the ring gear is mounted upon the output shaft by an overrunning clutch operating in the opposite direction.

Also, it is an object of the invention to provide such a reversing and reduction gear in which brake means is provided for the pinion gear and a second brake means is provided for the braking disc.

The above and other objects, apparent from the drawings and following description, may be attained, the above described difficulties overcome and the advantages and results obtained, by the apparatus, construction, arrangement and combination, subcombinations and parts which comprise the present invention, a preferred embodiment of which, illustrative of the best mode in which applicant has contemplated applying the principle, being set forth in detail in the following description and illustrated in the accompanying drawings.

In a preferred construction, my invention may be summarized as comprising a reversing and reduction gear including an input shaft with constant direction of rotation, eccentric means operatively connected thereto, a ring gear journalled relative to the eccentric means, an output shaft axially aligned with the input shaft, a pinion gear mounted upon the output shaft by an overrunning clutch operating in reverse direction to the input shaft, a braking disc journalled upon the output shaft by an overrunning clutch operating in opposite direction to the clutch for the pinion gear, pin and socket means operatively connecting the ring gear to the braking disc, brake means for the pinion gear, and independent brake means for the braking disc.

With this construction the output shaft may be selectively rotated in either direction from a constant direction of rotation input. By releasing the brake from the pinion gear and applying the brake to the braking disc, the ring gear will orbit around the pinion gear without rotating upon its axis, causing the pinion gear to rotate the distance of one tooth for every orbit of the ring gear.

By releasing the brake from the braking disc and applying the brake to the pinion gear, the ring gear will rotate on its axis, around the pinion gear, and through the pin and socket connection will rotate the braking disc therewith. This rotation of the braking disc through the corresponding overrunning clutch will rotate the output shaft in the same direction as the input shaft. By releasing both brakes, both the ring gear and pinion gear will be permitted to free wheel, thus disconnecting the input shaft from the output shaft.

Referring now more particularly to the embodiment of the invention illustrated;

FIG. 1 is a longitudinal sectional view through a reversing and reduction gear embodying the invention;

FIG. 2 is a transverse section on the line 2—2, FIG. 1, looking in the direction of the arrows; and FIG. 3 is a transverse section on the line 3—3, FIG. 1, looking in the direction of the arrows.

Referring now more particularly to the embodiment of the invention illustrated, the device may be mounted in a housing, indicated generally at 1, connected, as by the stand 2, to a suitable base 3 for mounting upon any conventional horizontal support. An input shaft 4 is journalled within one side of the housing, as by the bearings 5, and is shown provided with a drive gear 6 by means of which it may be operatively connected to any suitable source of motive power.

The input shaft 4 is driven in a constant direction of rotation, and for the purpose of illustration it may be assumed that, as viewed in FIG. 2, it is constantly rotated in counterclockwise direction.

An eccentric ring 7 is connected to the input shaft 4, as by the flexible disc or spokes 8. Journalled within the eccentric ring 7, as by the bushing or bearing 9, is a ring gear 10. This ring gear, and the pinion gear to be later described, are of the "Gerotor" type of gear-within-gear.

An output shaft 11 is journalled within the housing, in alignment with the input shaft 4, being shown journalled in the bearings 12. A pinion gear 13 is mounted upon the output shaft 11 by an overrunning clutch 14, which operates clockwise, as related to the input shaft 4.

A braking disc 15 is mounted upon the output shaft 11 by the overrunning clutch 16, which operates counterclockwise relative to the clutch 14. Four or more equally spaced pins 17 upon the face of the ring gear 10 engage in large apertures 18 in the braking disc 15.

A brake device 19, fixed upon the inner end of the longitudinally reciprocable rod 20, within the hollow input shaft 4, may be applied to the face of the pinion gear 13 to hold the same against rotation. A brake device 21, independent of the brake device 19, mounted upon the transversely reciprocable rod 22, may be applied to the braking disc 15 to prevent rotation thereof.

In the operation of the apparatus, with the input shaft 4 constantly driven in counter-clockwise direction, as viewed in FIG. 2, assuming that the brake device 19 is released from the pinion gear 13 and the brake means 21 is applied to the brake disc 15, the ring gear 10 will be orbited in counter-clockwise direction but will not turn upon its axis owing to the engagement of the pins 17 thereon in the sockets or openings 18 in the braking disc 15 which is held against rotation.

With every complete orbit of the ring gear 10 in counter-clockwise direction, the pinion gear 13, which has one tooth less than the ring gear, will be rotated upon its axis the distance of one tooth in clockwise direction, and through the overrunning clutch 14 will rotate the output shaft 11 the same distance in clockwise direction.

The overruning clutch 16, between the output shaft 11 and the hub of the braking disc 15, will permit this rotation of the output shaft 11 within the stationary braking disc 15. Now assume that the brake 19 is applied to the pinion gear 13 and the brake 21 is released from the braking disc 15. With rotation of the input shaft 4 in counter-clockwise direction, since the pinion gear 13 is held against rotation, the rotation of the eccentric ring 7 will cause the ring gear 10 to rotate on its axis around the stationary pinion gear 13 in counter-clockwise direction.

Through the pins 17 and sockets or apertures 18 the released braking disc 15 will be caused to rotate around its axis, in counter-clockwise direction, and through the overrunning clutch 16 the output shaft 11 will be rotated in counter-clockwise direction thereby.

If both brake devices 19 and 21 are released, both the ring gear 10 and pinion gear 13 will be permitted to free wheel, thus disconnecting the input shaft from the output shaft so that there is no rotation of the output shaft.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of consrtuction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A reversing and reduction gear comprising an input shaft, means for rotating said input shaft, an output shaft journalled in alignment with the input shaft, a pinion gear, an overruning clutch mounting the pinion gear on the output shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging means on the ring gear and the rotatable braking means, brake means for holding the rotatable braking means against rotation for preventing the ring gear from turning on its axis while permitting its eccentric motion, and a second brake means for holding the pinion gear against rotation and causing the ring gear to rotate on its axis around the pinion gear, whereby the application of one of said brake means will cause the output shaft to rotate in one direction and application of the other brake means will cause the output shaft to rotate in the opposite direction, and whereby the release of both brake means will disconnect the input shaft from the output shaft.

2. A reversing and reduction gear comprising an input shaft, means for rotating said input shaft in one direction, an output shaft journalled in alignment with the input shaft, a pinion gear, an overruning clutch mounting the pinion gear on the output shaft, said overrunning clutch operating in a direction opposite to the rotation of the input shaft, a ring gear meshing with the pinion gear, said ring gear having a greater number of teeth than the pinion gear, means operatively connected to the input shaft for moving the ring gear eccentrically, a rotatable braking means, a second overruning clutch mounting the rotatable braking means on the output shaft, said second overruning clutch operating in direction opposite to the first-named overrunning clutch, interengaging means on the ring gear and the rotatable braking means, brake means for holding the rotatable braking means against rotation for preventing the ring gear from turning on its axis while permitting its eccentric motion, and a second brake means for holding the pinion gear against rotation and causing the ring gear to rotate on its axis around the pinion gear, whereby the application of the first-named brake means will cause rotation of the output shaft in opposite direction to the input shaft, and the application of the second brake means will cause rotation of the output shaft in the same direction as the input shaft, and whereby the release of both brake means will disconnect the input shaft from the output shaft.

3. A reversing and reduction gear comprising an input shaft, means for rotating said input shaft, an output shaft journalled in alignment with the input shaft, a pinion gear, an overrunning clutch mounting the pinion gear on the output shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging pin and socket means on the ring gear and the rotatable braking means, brake means for holding the rotatable braking means against rotation for preventing the ring gear from turning on its axis while permitting its eccentric motion, and a second brake means for holding the pinion gear against rotation and causing the ring gear to rotate on its axis around the pinion gear, whereby the application of one of said brake means will cause the output shaft to rotate in one direction and application of the other brake means will cause the output shaft to rotate in the opposite direction, and whereby the release of both brake means will disconnect the input shaft from the output shaft.

4. A reversing and reduction gear comprising an input shaft, means for rotating said input shaft in one direction, an output shaft journalled in alignment with the input shaft, a pinion gear, an overrunning clutch mounting the pinion gear on the output shaft, said overrunning clutch operating in a direction opposite to the rotation of the input shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging pin and socket means on the ring gear and the rotatable braking means, brake means for holding the rotatable braking means against rotation for preventing the ring gear from turning on its axis while permitting its eccentric motion, and a second brake means for holding the pinion gear against rotation and causing the ring gear to rotate on its axis around the pinion gear, whereby the application of the first-named brake means will cause rotation of the output shaft in opposite direction to the input shaft, and the application of the second brake means will cause rotation of the output shaft in the same direction as the input shaft, and whereby the release of both brake means will disconnect the input shaft from the output shaft.

5. A reversing and reduction gear comprising a tubular input shaft, means for rotating said input shaft, an output shaft journalled in alignment with the input shaft, a pinion gear, an overrunning clutch mounting the pinion gear on the output shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging means on the ring gear and the rotatable braking means, brake means for holding the rotatable braking means against rotation for preventing the ring gear from turning on its axis while permitting its eccentric motion, and a second brake means located through said tubular input shaft for holding the pinion gear against rotation and causing the ring gear to rotate on its axis around the pinion gear, whereby the application of one of said brake means will cause the output shaft to rotate in one direction and application of the other brake means will cause the output shaft to rotate in the opposite direction, and whereby the release of both brake means will disconnect the input shaft from the output shaft.

6. A reversing and reduction gear comprising a tubular input shaft, means for rotating said input shaft in one direction, an output shaft journalled in alignment with the input shaft, a pinion gear, an overrunning clutch mounting the pinion gear on the output shaft, said overrunning clutch operating in a direction opposite to the rotation of the input shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging means on the ring gear and the rotatable braking means, brake means for holding the rotatable braking means against rotation for preventing the ring gear from turning on its axis while permitting its eccentric motion, and a second brake means located through said tubular input shaft for holding the pinion gear against rotation and causing the ring gear to rotate on its axis around the pinion gear, whereby the application of the first-named brake means will cause rotation of the output shaft in opposite direction to the input shaft, and the application of the second brake means will cause rotation of the output shaft in the same direction as the input shaft, and whereby the release of both brake means will disconnect the input shaft from the output shaft.

7. A reversing and reduction gear comprising a tubular input shaft, means for rotating said input shaft in one direction, an output shaft journalled in alignment with the input shaft, a pinion gear, an overrunning clutch mounting the pinion gear on the output shaft, said overrunning clutch operating in a direction opposite to the rotation of the input shaft, a ring gear meshing with the pinion gear, said ring gear having a greater number of teeth than the pinion gear, means operatively connected to the input shaft for moving the ring gear eccentrically, a rotatable braking means, a second overrunning clutch mounting the rotatable braking means on the output shaft, said second overrunning clutch operating in direction opposite to the first-named overrunning clutch, interengaging pin and socket means on the ring gear and the rotatable braking means, brake means for holding the rotatable braking means against rotation for preventing the ring gear from turning on its axis while permitting its eccentric motion, and a second brake means located through said tubular input shaft for holding the pinion gear against rotation and causing the ring gear to rotate on its axis around the pinion gear, whereby the application of the first-named brake means will cause rotation of the output shaft in opposite direction to the input shaft, and the application of the second brake means will cause rotation of the output shaft in the same direction as the input shaft, and whereby the release of both brake means will disconnect the input shaft from the output shaft.

No references cited.

DAVID J. WILLIAMOWSKY, *Primary Examiner.*

J. R. BENEFIEL, *Assistant Examiner.*